United States Patent [19]

Murray et al.

[11] Patent Number: 5,870,153
[45] Date of Patent: Feb. 9, 1999

[54] ADAPTIVE COMB FILTER THAT CANCELS HUGAND CROSS-LUMINANCE ERRORS

[75] Inventors: Brian P. Murray, Dublin, Ireland; Christian Bohm, Neutraubling, Germany; Timothy Cummins, Clare, Ireland

[73] Assignee: Analog Devices, Inc., Norwood, Mass.

[21] Appl. No.: 866,738

[22] Filed: May 30, 1997

[51] Int. Cl.$^6$ ................................................ H04N 9/78
[52] U.S. Cl. .......................... 348/667; 348/668; 348/665
[58] Field of Search .................................. 348/609, 608, 348/610, 623, 624, 630, 631, 638, 640, 641, 653, 654, 663, 665, 666, 667, 668, 669, 670; H04N 9/78

[56] References Cited

U.S. PATENT DOCUMENTS

| | | | |
|---|---|---|---|
| 4,893,176 | 1/1990 | Faroudja | 348/609 |
| 4,930,005 | 5/1990 | Yamada et al. | 348/609 |
| 5,012,329 | 4/1991 | Lang et al. | 358/31 |
| 5,019,895 | 5/1991 | Yamamoto et al. | 348/609 |
| 5,097,322 | 3/1992 | Fairhurst | 358/31 |
| 5,355,176 | 10/1994 | Inagaki et al. | 348/609 |

*Primary Examiner*—Michael Lee
*Attorney, Agent, or Firm*—Fish & Richardson P.C.

[57] ABSTRACT

A comb filter for use in a video decoder is described. The comb filter includes a line memory for storing as successive pairs of U and V samples of a decoded video signal corresponding to a previous horizontal line of video information and a line memory for storing a second previous horizontal line of video information. The filter also includes a circuit to calculate an average value of both U and V from a previous sample and a corresponding sample from a previous line. The filter also includes a circuit for calculating a correction term for each one of the averages. The correction term is calculated from the opposite color component as was used to calculate the average value.

3 Claims, 4 Drawing Sheets

ADAPTIVE COMB FILTER THAT CANCELS HUGAND CROSS-LUMINANCE ERRORS

BACKGROUND OF THE INVENTION

This invention relates generally to video decoder systems and more particularly to comb filters used in video decoder systems.

As is known in the art, a composite video signal has luminance (Y) and color difference signals (U & V) combined together into one signal. The U and V signals also referred to as chrominance signals are quadrature modulated onto a subcarrier and added to the luminance signal to produce the composite video signal. By using a high frequency subcarrier, the color signal only disturbs the high frequency portion of the luminance signal.

A typical decoder architecture employed to decode the composite video signal generally includes an A/D converter which samples the composite signal and feeds the output of the A/D converter to a notch filter. The notch filter removes the color information centered about the color subcarrier frequency leaving the luminance signal Y. The composite video signal is also fed to a quadrature demodulator and a pair of low pass filters which recover the color difference signals U and V. The quadrature demodulator includes a phased lock loop which locks onto the color burst signal and controls a direct digital synthesizer which generates a local copy of the color subcarrier. The local copy of the color subcarrier is used to demodulate the composite signal fed to the demodulator. With this simple decoder architecture mentioned above, the high frequency luminance is still present as a cross-luminance term in the U and V signals. That is, the simple decoder arrangement mentioned above cannot distinguish between luminance and color information centered on the color carrier. One approach used to overcome this problem is to add to the simple decoder architecture a comb filter. The comb filter is used to remove or reduce the cross-luminance information in the U and V signals. Several types of comb filters can be used at the demodulation stage in the decoder. The comb filters fed by the U and V components from the output of the decoder can reduce the high frequency luminance.

It is also known in the art that currently there are two popular standards for video encoding. One standard called the NTSC standard and the other is called the PAL standard. The essential difference between the NTSC and the PAL standard is that the phase angle between the color difference components on successive lines is 180° for the NTSC standard and −90° for the PAL standard and that the NTSC standard has a subcarrier frequency of 3.58 MHz, whereas the PAL standard has a subcarrier frequency of 4.43 MHz.

For the PAL standard a number of comb filter implementations can be used after demodulation. Each of them, however, has certain disadvantages. For example, in a simple one horizontal line PAL comb filter, the color difference components (U, V) can be simply averaged over a current line and the previous line. The problem with this arrangement, however, is that this comb filter only cancels hue error but does not cancel cross-luminance error. A second PAL comb filter which averages a signal over a current line and a second previous line has the disadvantage that it only cancels the cross-luminance error but does not cancel the hue error. A three horizontal line comb filter which operates over four lines can cancel both the U and cross-luminance errors; however, it has a significant disadvantage that it greatly reduces the vertical bandwidth and needs to store three horizontal lines of video information. Thus, this implementation is more expensive than the foregoing implementations.

SUMMARY OF THE INVENTION

In accordance with the present invention, a comb filter includes means for storing as successive pairs of U and V samples of a decoded video signal corresponding to a previous horizontal line of video information and means for storing as successive pairs of U and V samples of a decoded video signal corresponding to a second previous horizontal line of video information. The filter also includes means for calculating for a previous sample of a first one of (U, V) an average of said previous sample with a corresponding sample from a previous line and means, responsive to a second different one of said (U, V) for calculating from samples of said second one of (U, V) over a previous line and a second previous line difference a term to correct for cross-luminance errors in said average of the first one of U, V. With such an arrangement, by introducing a difference correction term between the U samples from the previous and second previous lines in calculation of the V signal and for introducing a term corresponding to the difference between the V samples from the previous and second previous lines for the U signal, the comb filter substantially reduces both hue and cross-luminance errors in the U, V samples. These difference terms are sufficient to cancel out or substantially reduce out hue and cross-luminance errors provided that the differences between values of adjacent samples is relatively small. The cancellation is accomplished with only two line memories and results in minimal vertical filtering compared to prior approaches.

BRIEF DESCRIPTION OF THE DRAWINGS

The foregoing features and other aspects of the present invention will now become more apparent from the drawings taken together with the accompanying description in which.

DESCRIPTION OF THE PREFERRED EMBODIMENTS

Figure 1:
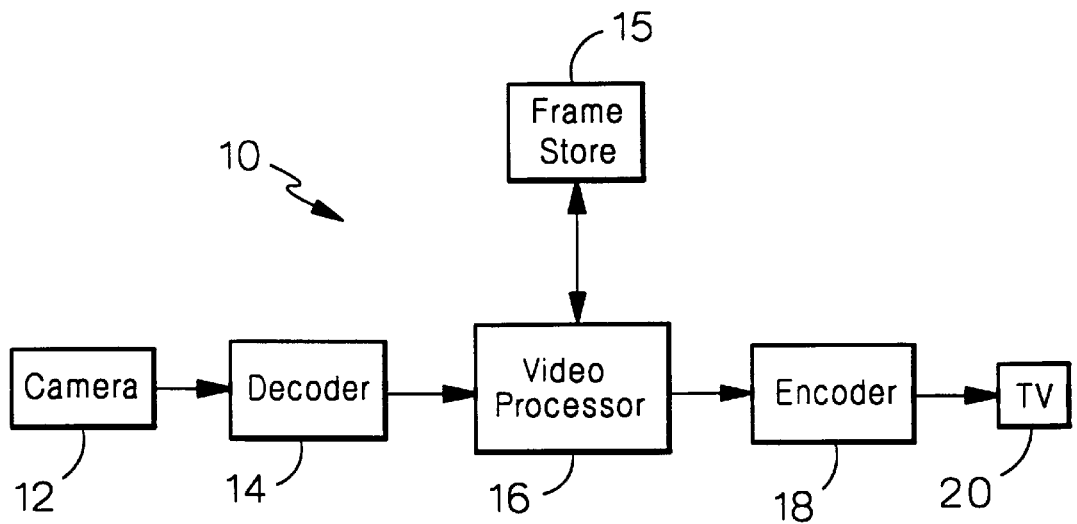
FIG. 1 is a block diagram of a typical video decoder-encoder system.

Referring now to FIG. 1, a typical decoder-encoder system 10 is shown. The decoder-encoder system 10 includes a video source such as a camera 12 which produces an analog video signal which is fed to a decoder 14. The decoder 14 decomposes the composite video signal into digital signals corresponding to a luminance component Y as well as color difference components U and V (or it may alternatively output YCrCb which are scaled versions of YUV). The Y, U and V signals are fed to a video processor 16 which can be used to enhance the video signal such as improved contrast, brightness etc. The video processor generally has a frame store 15 which is used to store a frame of video data. Thereafter, the output of the video processor is fed to an encoder 18 which is used to encode the information into a format which can be viewed on a device such as a television 20.

Figure 2:
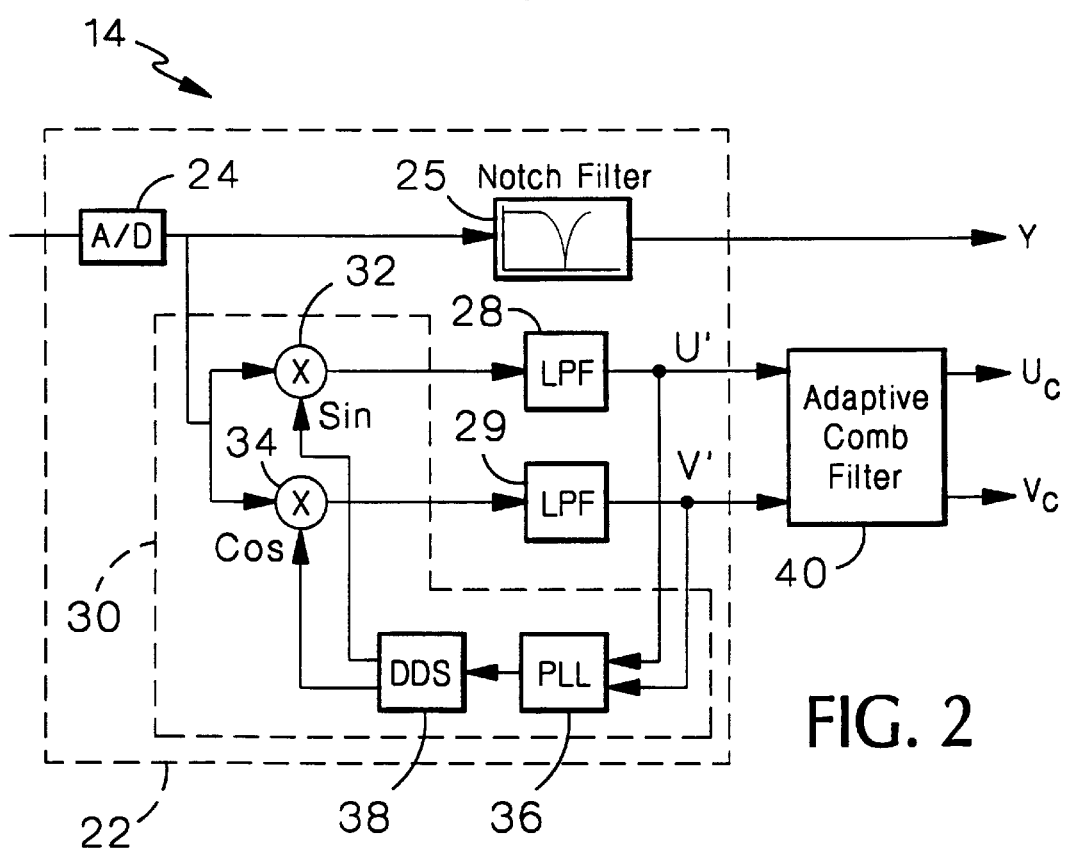
FIG. 2 is a block diagram of a decoder used in the decoder-encoder system of FIG. 1 including an adaptive comb filter.

Referring now to FIG. 2, the decoder 14 used in the decoder-encoder system of FIG. 1 includes an A/D converter 24 that receives the composite video signal from the video source 12 (FIG. 1). The A/D converter 24 converts the video signal into digitized signals which are fed respectively to a notch filter 25 and a quadrature detector 30. The notch filter 25 provides at an output thereof the Y or luminance component. The notch filter is designed to pass substantially all video frequency signals except for those having a frequency near or around the subcarrier frequency which carries the color signal information. The A/D converter output is also fed to a quadrature detector 30. The quadrature detector 30 is typically comprised of a pair of mixers 32 and 34 which are fed the video information as well as a local oscillator signal (i.e., generated local copy of the color subcarrier) which is provided via a direct digital synthesizer 38 and a phase locked loop 36. The mixers produce various frequency components including the components U and V of interest. These components are passed through low pass filters 28 and 29, respectively, to provide demodulated U' and V' components to the adaptive comb filter 40.

The output of the decoder circuit i.e. the demodulated signals U' and V' are given below for four demodulated pixels for a PAL decoder output on successive lines assuming a color subcarrier phases error of $\delta$.

| $V'_i$ | $U'_i$ |
|---|---|
| $V_i$ $V \cos(\delta) - U \sin(\delta) + Y \cos(\theta + \delta)$ | $U_i$ $U \cos(\delta) + V \sin(\delta) + Y \sin(\theta + \delta)$ |
| $V_{i-1}$ $V \cos(\delta) + U \sin(\delta) - Y \sin(\theta + \delta)$ | $U_{i-1}$ $U \cos(\delta) - V \sin(\delta) - Y \cos(0 + \delta)$ |
| $V_{i-2}$ $V \cos(\delta) - U \sin(\delta) - Y \cos(\theta + \delta)$ | $U_{i-2}$ $U \cos(\delta) + V \sin(\delta) - Y \sin(\theta + \delta)$ |
| $V_{i-3}$ $V \cos(\delta) + U \sin(\delta) + Y \sin(0 + \delta)$ | $U_{i-3}$ $U \cos(\delta) - V \sin(\delta) + Y \cos(\theta + \delta)$ |

Figure 3:
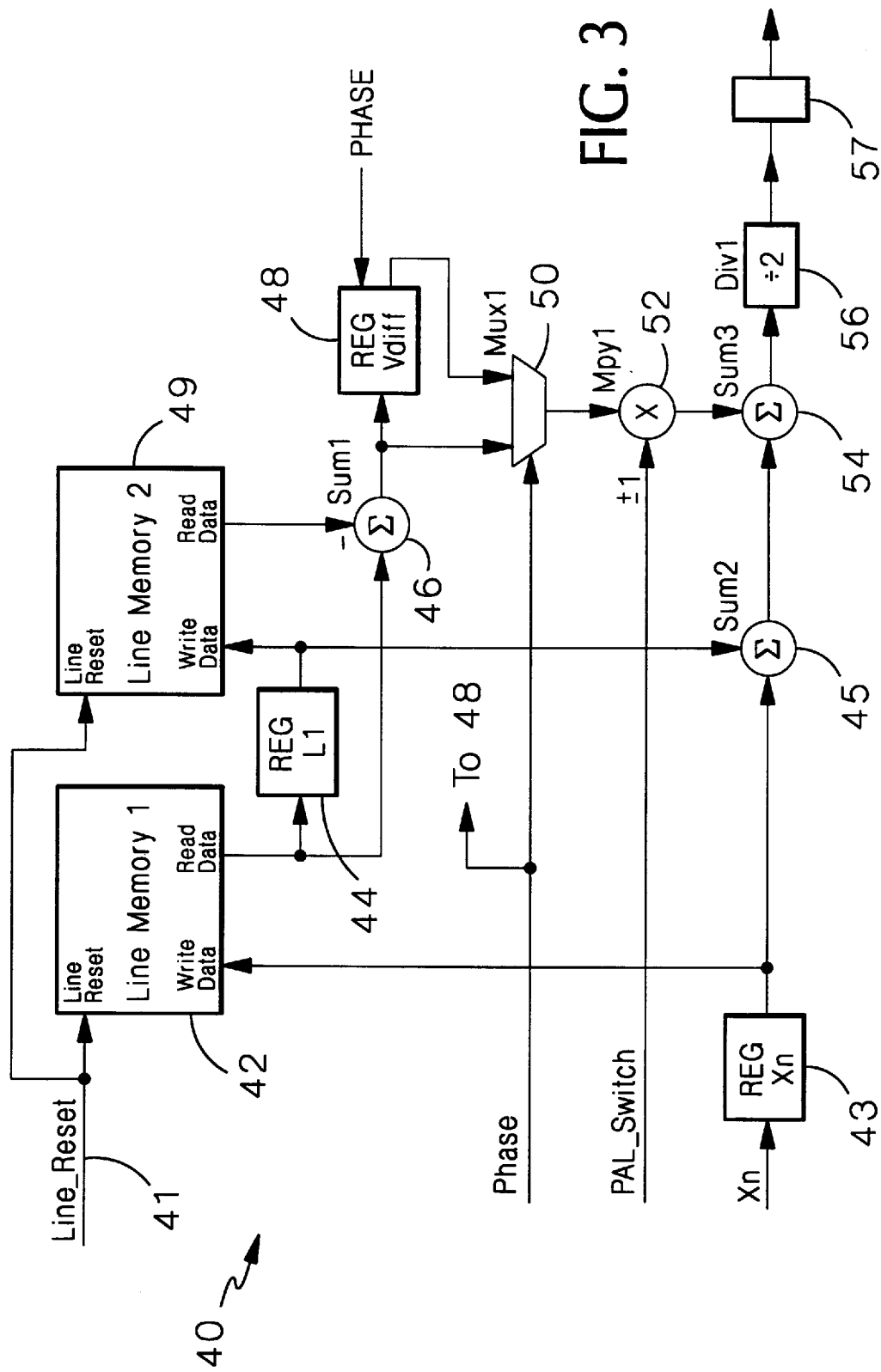
FIG. 3 is a block diagram of the adaptive comb filter used in the decoder of FIG. 2.
Figure 4:
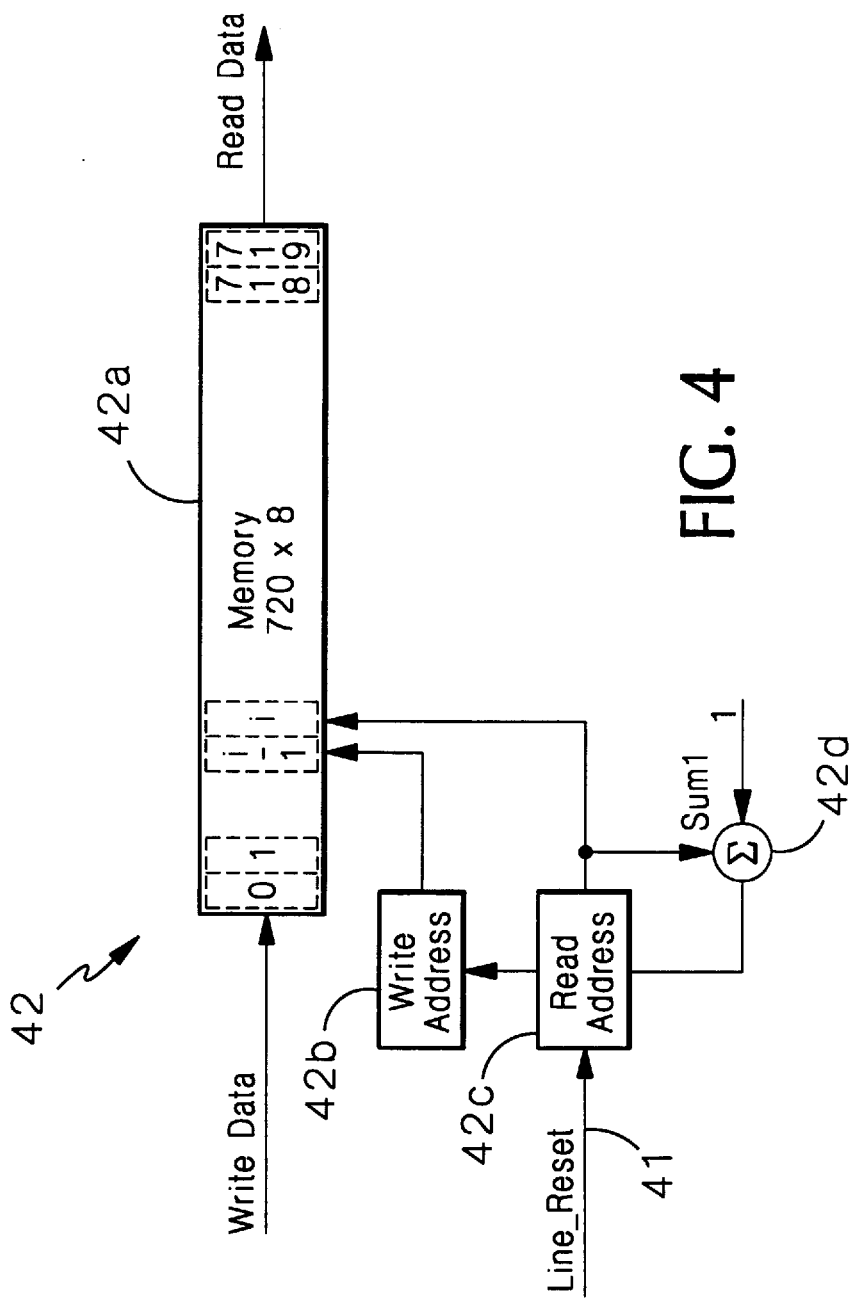
FIG. 4 is a block diagram showing an implementation of a line memory used in the comb filter of FIG. 2.

Referring now to FIG. 3, an adaptive comb filter 40 used to further filter U' and V' components provided from low pass filters 28 and 29 is shown to include a pair of line memories 42 and 49. The line memories which will be discussed in further detail in conjunction with FIG. 4 are used to store the previous line of video samples and the second previous line of video samples, respectively. The U' and V' samples are interleaved into one signal stream such that each second sample is a U or V sample. The line memories have a write data port and a read data port and are also fed via a signal LINE RESET which is used to reset the read data address at the start of each new horizontal line. The first write data port of line memory 42 is coupled to the output of a register 43 which receives the U' or V' samples for a current line corresponding in vertical location to previous and second previous line samples provided from line memories 42 and 49. The output or read data port of line memory 42 is coupled to a second register 44 which holds the output of the read data. Register 44 provides the write data for the line memory 49. The write data port of line memory 49 is coupled to an input of a summing circuit 45. The read data port of line memory 49 is coupled to a sum circuit 46 which has as a second input the read data port of line memory 42. Thus, the sum circuit 46 forms U, V difference terms corresponding to a difference in chrominance over a previous line and second previous line for a vertical location or pixel corresponding to the vertical location of the corresponding value of $X_n$ in register 43.

The output of summer 46 is fed to a register 48 and the output of register 48 as well as the output of summer 46 are fed to a multiplexer 50. The multiplexer 50 is controlled by a signal PHASE which in a logic "zero" state selects the output of register 48 and in a logic "one" state selects the output of sum circuit 46 to provide the output from the multiplexer 50. This output is fed to a multiplier circuit 52 which in response to a signal PAL_SWITCH multiplies the result from the multiplexer with a plus or minus 1. This result is sent to a third sum circuit 54 which sums the result from multiplier 52 with the result from sum circuit 45. The output of summer 54 is fed to a divider circuit 56 which divides the result by 2 (by a simple shift operation) producing the output from the comb filter 40. Optionally, rounding and saturation processing are also performed on the output of the filter. Comb filter 40 thus implements and executes the following equations which correspond to the filter response of the filter 40:

Two (2) Horizontal (2H) Line Comb Filter 40 response.

$V_c = \frac{1}{2}(V'_i + V'_{i-1}) + \frac{1}{2}(U'_{i-1} - U'_{i-2})$ for PAL_SWITCH=-1

$V_c = \frac{1}{2}(V'_i + V'_{i-1}) - \frac{1}{2}(U'_{i-1} - U'_{i-2})$ for PAL_SWITCH=1, where $V_c$ corresponds to corrected chrominance from the filter. Using the equations above for $V'_i$, $V'_{i-1}$, $U'_{i-1}$, and $U'_{i-2}$ and substituting into the equations for $U_c$ it can be shown that the hue error cancels (if $\delta$ is small), $V_c$ is as follows:

$$V_c = 1/2\cos(\delta)(V_i + V_{i-1}) - 1/2\sin(\delta)(V_{i-1} + V_{i-2}) -$$
$$1/2\sin(\delta)(U_I - U_{i-1}) + 1/2\cos(\delta)(U_{i-1} - U_{i-2}) +$$
$$1/2\cos(\theta + \delta)(Y_i - Y_{i-1}) - 1/2\sin(\theta + \delta)(Y_{i-1} - Y_{i-2})$$
$$V_c = 1/2\cos(\delta)V_i + 1/2(\cos(\delta) - \sin(\delta))V_{i-1} - 1/2\sin(\delta)V_{i-2}$$
$$= 1/2(V_i + V_{i-1}) \text{ if } \delta \text{ is small}$$

The equations for $U_c$ are:

$U_c = \frac{1}{2}(U_i + U_{i-1}) + \frac{1}{2}(V_{i-1} - V_{i-2})$ for PAL_SWITCH=-1

$U_c = \frac{1}{2}(U_i + U_{i-1}) - \frac{1}{2}(V_{i-1} - V_{i-2})$ for PAL_SWITCH=1, where $U_c$ corresponds to corrected chrominance from the filter.

From the equations above it can be seen that this comb filter cancels hue errors and a similar set of equations for $U_c$ would show that it cancels cross-luminance errors.

This filter 40 has the advantage of resulting in less vertical filtering. Furthermore, the filter only requires two line delays (line memories 42, 49) and only has a delay of half a line compared to prior PAL comb filter implementations.

The above-described comb filter 40 accomplishes the cancellation of hue and cross-luminance errors by introducing a difference term between the U samples from the previous and second previous lines in calculation of the V signal and for introducing a term corresponding to the difference between the V samples from the previous and second previous lines for the U signal. These difference terms are sufficient to substantially reduce hue and cross-luminance errors provided that the differences between values of adjacent samples are relatively small. For large differences in values the comb filter 40 is turned off as will be described below.

Referring now to FIG. 4, an illustrative example of a line memory such as line memory element 42 is shown to include a memory element 42a including a write data port, a read data port, write address control logic 42b and read address control logic 42c. The read address control 42b includes a summer 42d or counter which is used to increment the read address each clock cycle. Thus, for each new clock cycle the previous value of the read address is written to the write address control logic 42b and the write data is written to the memory location at the previous read address and the read address is read from the memory location at the next read address. Therefore, the write address always points to the previous address from the read address and the read address is always incremented after each clock cycle. A dual port memory or other such element can be used for the memory element 42a provided that the memory has the requisite number of locations corresponding to the number of pixels per line. For example, for a PAL implementation 720 locations of eight bits wide would be used.

Operation of the comb filter 40 will now be described in conjunction with FIGS. 3 and 4. The input signals fed to the register 43 alternates between U and V samples every second sample. That is, the U and V samples are interleaved into one signal stream $X_n$. Register 43 (REG_$X_n$) contains a previously input sample whereas line memories 42 and 49 contain the previous line and the second previous line samples corresponding to the sample input to the register 43. Register 44 (REG_L1) contains the sample from the previous line corresponding to the sample in register 43 (REG_$X_n$). REGVDIF register 48 contains the difference between the output of line memories 42 and 49 for the V samples for the previous and second previous lines. The contents of the register 48 are updated only when phase is zero. The output of the first summation circuit 46 corresponds to the difference between the output of line memories 42 and 49 for the previous sample in register 43. The signal PHASE has a value of 0 on even samples, that is, the input to the multiplexer 50 is ($V_{i-1}-V_{i-2}$) directly from summer 46 and 1 on odd samples, that is, the input is ($U_{i-1}-U_{i-2}$) from register 48. If the phase is 0 the output of multiplexer 50 is the contents of register 48 (VDiff). If the phase is 1, the output of multiplexer 50 corresponds to the output of sum circuit 46 (UDiff). The signal PAL_switch is recovered by a subcarrier phase locked loop (not shown) in a conventional manner and represents the phase of the V signal in the composite video signal. This signal normally alternates every second line between +1 and -1. If PAL_switch corresponds to a +1, the output of multiplier 52 is equal to the output of multiplexer 50, whereas, if the PAL_switch corresponds to a -1, the output of the multiplier 52 is equal to the negative value of the output of multiplexer 50. The output of summer 46 is the sum of the previous sample from line memory 42 and the second previous line sample from line memory 49. The output of summer 54 is the sum of the output of summer 45 and multiplier 52. The output of divider 56 is the output of sum 3 divided by 2 corresponding to the values given in Table 1 for each value of phase in PAL_switch.

TABLE 1

|  | Phase = 0 | Phase = 1 |
|---|---|---|
| PAL_SW = 1 | ½ ($U'_i + U'_{i-1}$) + ½ ($V'_i - V'_{i-1}$) | ½ ($V'_i + V'_{i-1}$) + ½ ($U'_i - U'_{i-1}$) |
| PAL_SW = -1 | ½ ($U'_i + U'_{i-1}$) - ½ ($V'_i - V'_{i-1}$) | ½ ($V'_i + V'_{i-1}$) - ½ ($U'_i - U'_{i-1}$) | where each of the $U'_i$, $V'_i$, $U'_{i-1}$ and $V'_{i-1}$ are in the n−1 pixel and are thus $U'^{n-1}_i$, $V'^{n-1}_i$, $U'^{n-1}_{i-1}$ and $V'^{n-1}_{i-2}$.

In the PAL implementation, a 13.5 MHz clock signal (not shown) controls each of the clocked elements such as the registers in the comb filter 40. On each new positive clock edge, a new sample $X''_i$ ($V''_i$ or $U''_i$) is clocked into register 43, the output of DIV1 56 is latched into an output register 57 and the output of sum circuit 46 is latched into register 48. The previous values of register 43 and register 44 are written into line memories 42 and 49. New values are read from line memories 42 and 49 and are clocked into register 44. Thus, the comb filter 40 processes the previous sample and registers the current input samples during each clock cycle.

Figure 5:
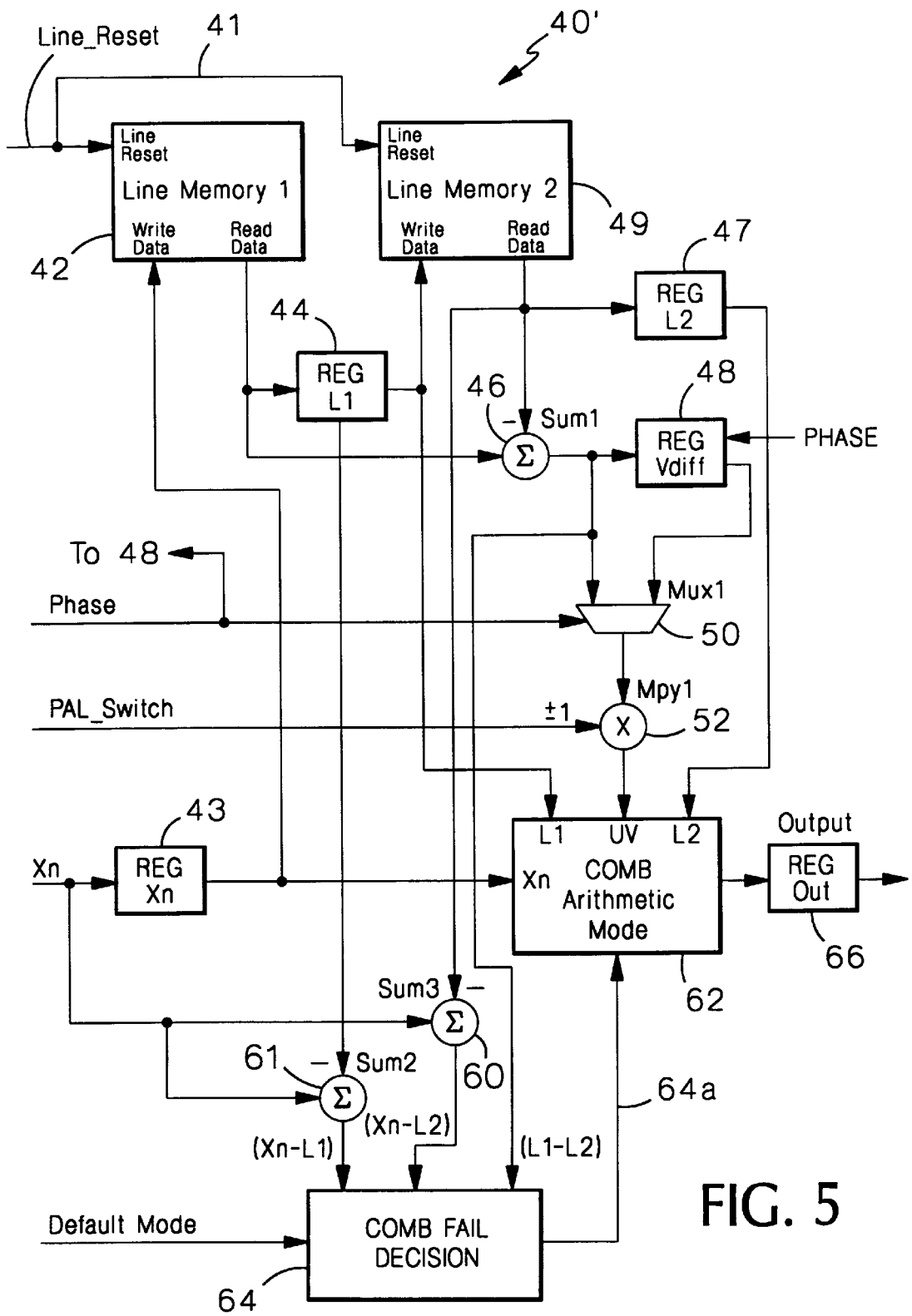
FIG. 5 is a block diagram of a selectable, adaptable NTSC and PAL comb filter also useful in the decoder of FIG. 2.

Referring now to FIG. 5, an adaptive NTSC and PAL selectable comb filter 40' is shown to include a similar arrangement of elements corresponding to those shown in FIG. 3. For example, the comb filter 40' includes line memories 42 and 49, the line reset signal 41 registers 43, 44 and 48. In addition, a register 47 is fed from the read data port of line memory 49. The comb filter 40' also includes sum circuit 46, multiplexer 50 fed by signal PHASE and multiplier 52 fed by signal PAL_SWITCH.

In addition to the foregoing mentioned elements, the comb filter 40' also includes a comb arithmetic switch circuit 62 and a comb fail decision circuit 64. The comb arithmetic circuit 62 produces the proper output from the filter by appropriate arithmetic manipulation of data fed thereto in accordance with a mode signal on line 64a. The comb arithmetic circuit 42 receives the mode signal from the comb fail decision logic 64. The arithmetic circuit is responsive to the inputs from registers 43, 44 and 47 as well as the output from multiplier 52. In accordance with the value of the mode signal fed to the comb arithmetic circuit 62, it produces one of here six preprogrammed responses. The responses are shown in Table 2, where the notation {1,0,0} represents the presence denoted as "1" or absence denoted by "0" or presence multiplied by 2 denoted as "2" of a sample of U or V for a current line, previous line or second previous line. The quantity is then divided or scaled by the number indicated as the coefficient to form the response.

TABLE 2

| Mode | Name | Response | Comment |
|---|---|---|---|
| 0 | 0H | {1,0,0}/1 | No comb, 0 H Delay, PAL/NTSC |
| 1 | 0H_1D | {0,1,0}/1 | No comb, 1 H Delay, PAL/NTSC (used with luminance 2H comb) |
| 2 | 1H | {1,1,0}/2 | 1H comb, ½ H Delay, PAL/NTSC |
| 3 | 2H | {1,2,1}/4 | 2H comb, 1 H Delay, PAL/NTSC |
| 4 | 2H_PAL | {1,0,1}/2 | 2H comb, 1 H Delay, PAL |
| 5 | 2H_New | {1,1,0}/2 ±{0,1,1}/2 | 1H comb, 1 H Delay, PAL (cross-color comb) |
| 6 | 1H_1D | {0,1,1}/2 | 1H comb, 1½ H Delay, NTSC (used during NTSC 2H comb fail) |

By selecting the proper mode, an adaptive comb filter which has a plurality of different modes of operation is provided.

As mentioned above, one of the problems with comb filters is that if there is a significant difference in the value of the samples on successive lines, i.e. if there is a change in the vertical direction, the filter will degrade rather than improve signal quality. That is, on pixel values in a common vertical line on adjacent horizontal lines a substantial change in magnitude of the values may provide an adverse affect on video signal quality. In those instances, it is better to turn off the comb filter or to use a different mode i.e. a comb fail mode.

The above circuit includes the comb fail decision circuit 64 which produces the mode signal fed to comb arithmetic circuit 62. The mode signal is illustratively a three bit encoded signal which is used to select one of the six modes mentioned above and will cause the comb arithmetic circuit to select no comb filter, or an appropriate comb filter configuration if the conditions so warrant. The comb fail mode filter is selected when the comb fail decision circuit 64 determines for each UV sample whether or not the current sample exceeds certain thresholds. For example, the thresholds which can be used are below.

The comb fail between the current line and previous is $Y0_{Fail}$ if $Abs(Y_i - Y_{i-1}) > Y_{thres\_On\_Off}$ The comb fail between the previous line and $2^{nd}$ previous is $Y1_{Fail}$ if $Abs(Y_{i-1} - Y_{i-2}) > Y_{thresh\_On\_Off}$ The comb fail between the current line and $2^{nd}$ previous is $Y2_{Fail}$ if $Abs(Y_i - Y_{i-2}) > Y_{thres\_On\_Off}$ If $Y2_{Fail}$ is required then $Y0_{Fail}$ and $Y1_{Fail}$ are not required and visa versa.

For calculation of these signals the Y samples for the previous line and the second previous line can also be stored in a line memory. Similar considerations apply for U and V.

Hysteresis is provided for the comb fail decision signals using six thresholds.

$$Y_{Thres\_On\_Off} U_{Thres\_On\_Off} V_{Thres\_On\_Off} Y_{Thres\_On\_Off} U_{Thres\_On\_Off} V_{thres\_On\_Off}$$

Hysteresis is applied in the horizontal direction jointly to the Y, U and V signals. Therefore, if the comb fail signal for the previous YUV pixel is zero, that is, the comb filter is on, then the threshold $Y_{threshold\_Hys} = Y_{thres\_On\_Off}$. If the comb fail signal for the previous YUV pixel is 1, that is, the comb is off, then the threshold $Y_{threshold\_Hys} = Y_{thres\_Off\_On}$. Likewise for U and V. If hysteresis is not enabled then the _On_Off is only used. For each pixel the following signals are calculated.

$Y0_{Fail}\ Abs(Y_i - Y_{i-1}) - Y_{Threshold\_Hys}$ or $Y2_{Fail}\ Abs(Y_i - Y_{i-2}) - Y_{Threshold\_Hys}$
$Y^1 0_{Fail}\ Abs(Y^1_i - Y^1_{i-1}) - Y_{Threshold\_Hys}$ or $Y^1 2_{Fail}\ Abs(Y^1_i - Y^1_{i-2}) - Y_{Threshold\_Hys}$
$U0_{Fail}\ Abs(U_i - U_{i-1}) - U_{Threshold\_Hys}$ or $U2_{Fail}\ Abs(U_i - V_{i-2}) - U_{Threshold\_Hys}$
$V0_{Fail}\ Abs(V_i - V_{i-1}) - V_{Threshold\_Hys}$ or $2_{Fail}\ Abs(V_i - V_{i-2}) - V_{Threshold\_Hys}$
$Y1_{Fail}\ Abs(Y_{i-1} - Y_{i-2}) - Y_{Threshold\_Hys}$
$Y^1 1_{Fail}\ Abs(Y_{i-1} - Y_{i-2}) - Y_{Threshold\_Hys}$
$U1_{Fail}\ Abs(U^1_{i-1} - U^1_{i-2}) - U_{Threshold\_Hys}$
$V1_{Fail}\ Abs(V_{i-1} - V_{i-2}) - V_{Threshold\_Hys}$ These eight signals, $$\{(Y0_{Fail}\|Y2_{Fail}\|\|Y1_{Fail}\|\|(Y^1 0_{Fail}\|Y^1 2_{Fail})\ Y^1 1_{Fail} V0_{Fail} V1_{Fail} U0_{Fail} U1_{Fail}\}$$

are ANDed with a mask FAIL_MASK and Ored together to generate an instantaneous comb fail decision. The FAIL_MASK may be programmed by a user or may have default values for each mode. Table 3 defines the default comb fail detection signals used for each mode. However using FAIL_MASK any combination of the signals can be used noting that only one of $YUV0_{Fail}$ or $YUV2_{Fail}$ are available.

TABLE 3

| Mode | Name | PAL/NTSC | YUV0/YUV2 | Comb Fail Decision CCOM_DEC |
|---|---|---|---|---|
| 0 | 0H | X | X | X |
| 1 | 0H_1D | X | X | X |
| 2 | 1H | NTSC | YUV0 | $Y0_{Fail} + U0_{Fail} + V0_{Fail}$ |
|   |   | PAL | X | X |
| 3 | 2H | NTSC | YUV0 | $Y0_{Fail} + Y1_{Fail} + U0_{Fail} + U1_{Fail} + V0_{Fail} +$ |
|   |   | PAL | YUV2 | $V1_{Fail}\ Y2_{Fail} + U2_{Fail} + V2_{Fail}$ |
| 4 | 2H_PAL | X | YUV2 | $Y2_{Fail} + U2_{Fail} + V2_{Fail}$ |
| 5 | 2H_New | X | YUV0 | $Y0_{Fail} + Y1_{Fail} + U0_{Fail} + V1_{Fail}$ |
| 6 | 1H_1D | X | X | X |

The instantaneous comb fail decision is filtered by counting this signal (on a UV pixel basis). A number of consecutive instantaneous comb fail decisions are required before a comb fail is registered (likewise for return from comb fail). For example, if the comb filter is on, an instantaneous comb fail for Count_On_Off, e.g., 4 consecutive pixels are required to turn off the comb. Likewise if the comb is off, an instantaneous comb nofail on Count_Off_On, e.g., 4 consecutive pixels is required to turn on the comb. Different count values are used for on to off to on to allow a fast attack and slow decay.

The following Tables 4 and 5 define the comb filter modes (Table 4) and the mode during comb fail (Table 5). The comb filter can fail to the best of the one horizontal line comb filters shown in table 5.

Having described preferred embodiments of the invention, it will now become apparent to one of ordinary skill in the art that other embodiments incorporating their concepts may be used. It is felt, therefore, that these embodiments should not be limited to the disclosed embodiments, but rather should be limited only by the spirit and scope of the appended claims.

TABLE 4

| Mode | Name | Response | Comb Fail Modes | Comment |
|---|---|---|---|---|
| 0 | 0H | [1,0,0]/1 | No Fail | No comb, 0 H Delay, PAL/NTSC |
| 1 | 0H_1D | [0,1,0]/1 | No Fail | No comb, 1 H Delay, PAL/NTSC (used with luminance 2H comb) |
| 2 | 1H | [1,1,0]/2 | NTSC→0H PAL→No Fail | 1H comb, ½ H Delay, PAL/NTSC |
| 3 | 2H | [1,2,1]/4 | NTSC→0H_1D/1H/1H_1D | 2H comb, 1 H Delay, |

TABLE 4-continued

| Mode | Name | Response | Comb Fail Modes | Comment |
|------|------|----------|-----------------|---------|
| 4 | 2H_PAL | [1,0,1]/2 | PAL→0H_1D/1H<br>PAL→0H + 1D/1H | PAL/NTSC<br>2H comb, 1 H Delay, PAL |
| 5 | 2H_New | [1,1,0]/2 ±<br>[0,1,1]/2 | PAL→0H_1D/1H | 1H comb, 1 H Delay, PAL<br>(cross-color comb) |
| 6 | 1H_1D | [0,1,1]/2 | No Fail | 1H comb, 1½ H Delay, NTSC<br>(used during NTSC 2H comb fail) |

TABLE 5

| Mode | Name | PAL/NTSC | 0H/1H | Comb Fail Detection Signals | Comb Fail Mode |
|------|------|----------|-------|-----------------------------|----------------|
| 3 | 2H | NTSC | 0H | X | →0H_1D |
| | | | 1H | $(Y0_{Fail} + U0_{Fail} + V0_{Fail}) = 1$ & $(Y1_{Fail} + U1_{Fail} + V1_{Fail}) = 1$ | →0H_1D |
| | | | 1H | $(Y0_{Fail} + U0_{Fail} + V0_{Fail}) = 0$ & $(Y1_{Fail} + U1_{Fail} + V1_{Fail}) = 1$ | →1H |
| | | | 1H | $(Y0_{Fail} + U0_{Fail} + V0_{Fail}) = 0$ & $(Y1_{Fail} + U1_{Fail} + V1_{Fail}) = 0$ | →1H_1D |

What is claimed is:

1. A comb filter comprising:

a first line memory which stores samples of decoded U and decoded V values for a previous horizontal line;

a second line memory which stores samples of decoded U and decoded V values for a second previous horizontal line;

a processor, responsive to previous input samples of U and V for the previous line and the second previous line, and responsive to a signal PAL_switch for providing corrected ($U_c$) and ($U_c$) signals according to the following equations:

for $U_c$, $$U_c = \frac{1}{2}(U_i + U_{i-1}) + \frac{1}{2}(V_{i-1} - V_{i-2}) \text{ for PAL\_switch=0}$$

$$U_c = \frac{1}{2}(U_i + U_{i-1}) + \frac{1}{2}(V_{i-1} - V_{i-2}) \text{ for PAL\_switch=1,}$$

and for $V_c$ $$V_c = \frac{1}{2}(V_i + V_{i-1}) + \frac{1}{2}(U_{i-1} - U_{i-2}) \text{ for PAL\_switch=0}$$

$$V_c = \frac{1}{2}(V_i + V_{i-1}) + \frac{1}{2}(U_{i-1} - U_{i-2}) \text{ for PAL\_switch=1.}$$

2. A comb filter comprising:

means for storing successive pairs of U and V samples of a decoded video signal, corresponding to a previous horizontal line of video information;

means for storing successive pairs of U and V samples of a decoded video signal corresponding to a second previous horizontal line of video information;

means for calculating for a sample of a first one of U and V an average of said sample with a corresponding sample from a previous horizontal line; and means, responsive to a second one of said U and V for calculating a difference from samples of said second one of U and V over a previous horizontal line and a second previous horizontal line, to provide a term to correct for cross-luminance errors in said average of the first one of U, V.

3. A comb filter comprising:

means for storing successive pairs of U and V samples of a decoded video signal corresponding to a previous horizontal line of video information;

means for storing successive pairs of U and V samples of a decoded video signal corresponding to a second previous horizontal line of video information;

means for calculating for a previous sample of a first one of U and V an average of said previous sample with a corresponding sample from a previous horizontal line;

means, responsive to a second different one of said U and V samples, for calculating over samples of said second one of U and V over a previous horizontal line and a second previous horizontal line a term to correct for cross-luminance errors in said average of the first one of U and V;

mode control means for selecting a mode of operation of said comb filter in accordance with a mode control signal and for outputting as an output of said comb filter U and V values corresponding to a mode selected by the mode control signal; and means for detecting large vertical transitions in magnitudes of samples of U and V over different horizontal lines, and for providing a mode signal to the mode control means for selecting the operation mode in accordance with the detected vertical transitions.

* * * * *